United States Patent [19]

Cavitt et al.

[11] Patent Number: 4,530,948

[45] Date of Patent: Jul. 23, 1985

[54] ROOM TEMPERATURE COATING COMPOSITIONS CONTAINING HYDROLYZED EPOXY NOVOLAC RESINS

[75] Inventors: Michael B. Cavitt; Charles H. Moore, both of Lake Jackson, Tex.

[73] Assignee: The Dow Chemical Company, Midland, Mich.

[21] Appl. No.: 620,592

[22] Filed: Jun. 14, 1984

Related U.S. Application Data

[63] Continuation-in-part of Ser. No. 408,352, Aug. 16, 1982, abandoned.

[51] Int. Cl.³ .......................... C08K 5/01; C08K 5/07; C08K 5/06; C08L 63/04
[52] U.S. Cl. .................................. 523/454; 523/456; 525/430; 525/420.5; 525/423; 525/533
[58] Field of Search .................... 525/420.5, 423, 504, 525/523, 430, 533; 523/454, 456

[56] References Cited

U.S. PATENT DOCUMENTS

| | | | |
|---|---|---|---|
| 3,632,836 | 1/1972 | Walker | 525/524 |
| 3,787,508 | 1/1974 | Walker | 568/648 |
| 3,891,525 | 6/1975 | Irwin et al. | 204/181 |
| 3,991,028 | 11/1976 | Irwin et al. | 204/181 |
| 4,145,324 | 3/1979 | Chen | 523/416 |

*Primary Examiner*—John C. Bleutge
*Assistant Examiner*—Robert E. L. Sellers
*Attorney, Agent, or Firm*—J. G. Carter

[57] ABSTRACT

Properties of room temperatures cured epoxy resin coatings are improved by hydrolyzing at least a portion of the epoxy groups.

5 Claims, No Drawings

ROOM TEMPERATURE COATING COMPOSITIONS CONTAINING HYDROLYZED EPOXY NOVOLAC RESINS

CROSS REFERENCE TO RELATED APPLICATION

This application is a continuation-in-part of copending application Ser. No. 408,352 filed Aug. 16, 1982, now abandoned.

BACKGROUND OF THE INVENTION

The present invention relates to room temperature curable epoxy novolac resin coating compositions containing hydrolyzed epoxy groups.

Walker in U.S. Pat. Nos. 3,632,836 and 3,787,508 discloses the use of hydrolyzed epoxy resins in epoxy resin coatings up to an amount of 20 percent by weight to improve the reactivity of the epoxy resin and to improve pigment dispersability in the epoxy resin coating composition.

Irwin in U.S. Pat. Nos. 3,891,525 and 3,991,028 discloses the use of hydrolyzed epoxy resins in water dispersed electrodepositable coating compositions employing an interpolymer of a hydroxyalkyl ester of an unsaturated acid and an amine-aldehyde resin.

Irwin et al in U.S. Pat. No. 4,145,234 disclose coating formulations of (1) an oil in water emulsion of a solution of a hydrolyzed diglycidyl ether of a bisphenol, a non-ionic surfactant and a curing agent; or (2) a solution of a hydrolyzed diglycidyl ether of a bisphenol and a curing agent in alkoxyethanol or a mixture of alkoxyethanol with alcohols, ketones, carbitols or their acetates and, optionally, liquid aromatic hydrocarbon solvents. Such solution coating compositions are stated to have solid (non-volatile) content of from 15 to about 35 weight percent.

It has now been discovered that one or more of the properties of room temperature coatings prepared from epoxy novolac resins can be improved by hydrolyzing at least a portion of the epoxy groups of said novolac resin.

SUMMARY OF THE INVENTION

The present invention concerns coating compositions curable at temperatures less than about 35° C. which comprise (1) at least one hydrolyzed epoxy novolac resin having an average epoxide functionality before hydrolysis of from about 2.01 of about 10, preferably from about 2.2 to about 5 and wherein from about 3 to about 50, preferably from about 5 to about 20 percent of the epoxy groups have been hydrolyzed;

(2) a curing amount of at least one curing agent for component (1) selected from polyamides, primary amine compounds and secondary amine compounds; and (3) a sufficient quantity of a suitable solvent system so as to provide the coating composition with a suitable application viscosity.

DETAILED DESCRIPTION OF THE INVENTION

Any epoxy novolac resin, when at least partially hydrolyzed, can be employed in the present invention. Suitable such epoxy novolac resins, before hydrolysis are disclosed, for example, in *Handbook of Epoxy Resins* by Lee and Neville, McGraw-Hill, 1967 which is incorporated herein by reference.

Any process can be employed to hydrolyze the epoxy novolac resins employed in the present invention such as those methods disclosed by Walker in U.S. Pat. Nos. 3,632,836; 3,405,093; 3,787,508.

A particularly suitable process for hydrolyzing the epoxy resins employed in the present invention comprises reacting the epoxy resin with water in the absence of substantial quantities of an organic solvent in the presence of catalytic quantities of a combination catalyst comprising (1) at least one dicarboxylic acid and (2) a phosphonium compound wherein components (1) and (2) are present in a molar ratio of from about 1:1 to about 20:1, preferably from about 3:1 to about 10:1, most preferably from about 5:1 to about 7:1, respectively.

Suitable dicarboxylic acids which can be employed herein include those having from 2 to about 10, preferably from about 2 to about 6, most preferably from about 2 to about 4, carbon atoms, such as, for example, oxalic acid, malonic acid, succinic acid, glutaric acid, adipic acid, pimelic acid, suberic acid, azelaic acid, sebacic acid, mixtures thereof and the like.

Also suitable are the hydrates of the aforementioned acids.

Suitable phosphonium catalysts which can be employed with the dicarboxylic acid for hydrolyzing the epoxy resins include, for example, those disclosed by Perry in U.S. Pat. No. 3,948,855 or by Dante in U.S. Pat. No. 3,477,990 which are incorporated herein by reference. Particularly suitable phosphonium catalysts include, for example, ethyltriphenylphosphonium chloride, ethyltriphenylphosphonium bromide, ethyltriphenylphosphonium iodide, ethyltriphenylphosphonium acetate, ethyltriphenylphosphonium diacetate (ethyltriphenylphosphonium acetate.acetic acid complex), tetrabutylphosphonium chloride, tetrabutylphosphonium bromide, tetrabutylphosphonium iodide, tetrabutylphosphonium acetate and tetrabutylphosphonium diacetate (tetrabutylphosphonium acetate.acetic acid complex). The total quantity of catalyst varies from time to time, depending upon the conditions employed, but is usually from about 0.001 to about 0.01, preferably from about 0.003 to about 0.008 moles of total catalyst per epoxide equivalent contained in the resin or resins to be hydrolyzed. Higher quantities can be employed, but no beneficial results are obtained.

The hydrolysis process is conducted at temperatures of from about 50° C. to about 200° C., preferably from about 110° C. to about 150° C. for a period of time to reach the desired degree of hydrolysis.

The amount of water employed is dependent upon the desired degree of hydrolysis, but usually from about 0 to about 100, preferably from about 0 to about 30, most preferably from about 0 to about 5 percent in excess of the theoretical amount of water required for hydrolysis is employed.

Suitable primary and secondary amine curing agents which can be employed in the coating compositions of the present invention include aliphatic primary and secondary amines such as, for example, ethylenediamine, 1,3-propane diamine, 1,4-butane diamine, 1,5-pentane diamine, 1,6-hexane diamine, diethylenetriamine, triethylenetetramine, tetraethylenepentamine, bis(hexamethylene)triamine, aminoethylethanolamine, dimethylaminopropylamine, diethylaminopropylamine, methyliminobispropylamine, menthane diamine, 1,3- diaminocyclohexane, N-aminoethyl piperazine, isophoronediamine, diethanolamine, methylethanolamine, ethylethanolamine, dimethylamine, diethylamine, methylethylamine, methyl-n-propylamine, piperidine, morpholine; aromatic polyamines such as, for example, m-phenylenediamine, 4,4'-methylenedianiline, diaminodiphenylsulfone, 2,4-toluenediamine, o-phenylenediamine, mixtures thereof and the like.

Also suitable as curing agents are polyamides, particularly fatty polyamides.

Most of these and other curing agents are described in the aforementioned *Handbook of Epoxy Resins*, which is incorporated herein by reference.

Suitable solvents which can be employed herein include, for example, ketones such as, for example, acetone, methyl ethyl ketone, and the like, glycol ethers such as, for example, butylene glycol methyl ether, diethylene glycol n-butyl ether, diethylene glycol ethyl ether, diethylene glycol methyl ether, dipropylene glycol methyl ether, ethylene glycol n-butyl ether, ethylene glycol methyl ether, ethylene glycol phenyl ether, propylene glycol methyl ether, tripropylene glycol methyl ether; glycol esters such as, for example, ethylene glycol monoethyl ether acetate, ethylene glycol monobutyl ether acetate, ethylene glycol monomethyl ether acetate, and the like; mixtures of the above with aromatic hydrocarbons such as, for example, toluene, xylene and the like.

The following examples are illustrative of the invention, but are not to be construed as to limiting the scope thereof in any manner.

The following components were employed in the examples.

CATALYST A is a 70 weight % solution of ethyltriphenyl phosphonium acetate.acetic acid complex in methanol.

CATALYST B is oxalic acid.$2H_2O$.

EPOXY RESIN A is a phenol-formaldehyde epoxy novolac resin having an average epoxide functionality of about 3.6 and an average EEW of about 181.

EPOXY RESIN B is a phenol-formaldehyde epoxy novolac resin having an average epoxy functionality of about 3.6 and an average EEW of about 178.

EPOXY RESIN C is a hydrolyzed epoxy resin prepared in a manner similar to Example 1 of U.S. Pat. No. 3,632,836 as follows:

A 2-liter pressure reactor was charged in order, with 300 g (1.685 epoxy equivalents) of Epoxy Resin B, 297.9 g (16.550 moles) of water, 2.1 g (0.017 mole) of Catalyst B and 300 g (4.160 moles) of methyl ethyl ketone. The reactor was sealed, purged with nitrogen and left with a 75 psig (517.1 kPa) of nitrogen. The contents were heated to 135° C. in 1.83 hour (6588 s) and maintained at 136° C. for 5.25 hours (18,900 s). The reactor was cooled to about 55° C. and the mixture collected. The solution was vacuum stripped for 1 hour (3600 s) at 140° C. to obtain the product which had 99% of the epoxy groups hydrolyzed.

EPOXY RESIN D is a mixture of 17.94 g of Epoxy Resin B and 2.06 g of Epoxy Resin C such that the total degree of hydrolysis of the mixture was 11% of the epoxy groups.

CURING AGENT A is a reaction product of a polyfunctional carboxylic acid and a polyalkylenepolyamine with an amine hydrogen equivalent weight of about 170 commercially available from Henkel Corp. as VERSAMID 115.

CURING AGENT B is a polyalkylenepolyamine with an amine hydrogen equivalent weight of about 24.4.

The following components were employed to evaluate coating performance on cold rolled steel panels using the resin examples.

COATING FORMULATION A was made up of two parts. Part 1 contained the resin and Part 2 contained the curing agent. Part 1 and 2 were mixed and given an induction time of one hour (3600 s) at 25° C. At the end of one hour (3600 s), the coating was made. Part 1 was composed of 100 parts resin, 72 parts methyl isobutyl ketone, 37 parts of the methyl ether of propylene glycol and 1.7 parts of a urea-formaldehyde resin that is 60% N.V. in butanol and xylol as a flow control agent. Part 2 was composed of 120 parts xylene and 80 parts of curing agent A. All parts were based on mass. This formulation was used to coat steel panels and they were allowed to cure at ambient temperature for 7 days (604,800 s).

COATING FORMULATION B was made up of 100 parts resin, 109 parts of methyl ethyl ketone, 1.7 parts of a urea-formaldehyde resin that is 60% N.V. in butanol and xylol as a flow control agent and a stoichiometric amount of curing agent B. All parts were based on mass. When all parts were mixed together, a coating was prepared and allowed to cure at ambient temperature for 7 days (604,800 s).

COATING FORMULATION C was made up of two parts. Part 1 contained the resin and Part 2 contained the curing agent. Parts 1 and 2 were mixed and given an induction time of one hour (3600 s) at 25° C. At the end of one hour (3600 s), the coating was made. Part 1 was composed of 100 parts resin, 72 parts methyl isobutyl ketone, 37 parts of the methyl ether of propylene glycol, 25 parts of methanol and 1.7 parts of a urea-formaldehyde resin that is 60% N.V. in butanol and xylenol as a flow control agent. Part 2 was composed of 120 parts xylene and 80 parts of Curing Agent A. All parts were based on mass. This formulation was used to coat steel panels which were allowed to cure at ambient temperature for 7 days (604,800 s).

Coatings made from the epoxy resins were evaluated by the following tests.

MEK DOUBLE RUBS

To the ball end of a 2 lb. ball pein hammer was attached a pad of cheese cloth composed of 8 plys. The pad was saturated with methyl ethyl ketone (MEK) and then rubbed across a coated substrate. A constant back and forth motion is used allowing only the weight of the hammer to apply force on the coating. A back and forth movement counts as one double rub. This motion is continued until the coating is mared and/or begins to be removed by the solvent effect.

PENCIL HARDNESS

This procedure can be found in *Paint Testing Manual* by H. A. Gardner and G. G. Sward in the 12th edition (1962) pages 131 and 132. One part was modified. When the coating is broken to the metal surface, that constitutes a failure. The results reported here are a pencil hardness that does not break the film but the next harder pencil grade does break film.

GLACIAL ACETIC ACID SPOT TEST

A coating that has been applied to a substrate and cured such as cold rolled steel can be tested for chemical resistance. In this test glacial acetic acid (≅1 ml) is placed on the coating. A timer is started. When the coating delaminates from the substrate, failure has occurred and the timer stopped. This time that has been and unhydrolyzed epoxy resin such that the blend contained essentially the same amount of hydrolysis as the partially hydrolyzed epoxy resin prepared in Example 2. The results are given in the following Table.

|  | COATING A | COATING B* | COATING C | COATING D* | COATING E* | COATING F* | COATING G |
|---|---|---|---|---|---|---|---|
| EPOXY RESIN | Ex. 1 | A | Ex. 1 | A | B | D | Ex. 2 |
| FORMULATION | A | A | B | B | C | C | C |
| PENCIL HARDNESS[1] | H | B | F | 4B | 2B | 2B | 2B |
| MEK DOUBLE RUBS | >200 | 90 | >200 | 54 | 10 | 15 | 43 |
| GLACIAL ACETIC ACID SPOT TEST, seconds | 360 | 180 | N.D.[2] | N.D. | 35 | 38 | 60 |

*Not an example of the present invention.
[1]The values going from poorest to best are: 6B, 5B, 4B, 3B, 2B, B, HB, F, H, 2H, 3H, 4H, 5H, and 6H.
[2]N.D. = not determined.

recorded is then called time to failure for glacial acetic acid.

EXAMPLE 1

A 2 liter pressure reactor was charged in order, with 700 g (3.888 epoxy equivalents) of epoxy resin A, 1.3 g (0.002 mole) of catalyst A, 9.60 g (0.533 mole) of water and 2 g (0.016 mole) of catalyst B. The reactor was sealed, purged with nitrogen and left with a 24 psig (165.5 kPa) of nitrogen. The contents were heated to 134° C. in 0.57 hour (2052 s) and maintained at 140° C. for 1.02 hour (3672 s). The reactor was then heated to 190° C. and the temperature maintained at about 190° C. under a vacuum for about 0.5 hour (1800 s). The resultant product had 12% of the epoxy groups hydrolyzed.

EXAMPLE 2

A 2-liter pressure reactor was charged in order, with 600 g (3.371 epoxy equivalents) of Epoxy Resin B, 0.69 g (0.001 mole) of Catalyst A, 5.79 g (0.321 mole) of water and 1.09 g (0.009 mole) of Catalyst B. The reactor was sealed, purged with nitrogen and left with a 20 psig (137.9 kPa) of nitrogen. The contents were heated to 134° C. in 0.85 hour (3060 s) and maintained at 134° C. for 1.5 hours (5400 s). The reactor was then heated to 180° C. and the temperature maintained at about 180° C. under a vacuum for about 0.5 hour (1800 s). The resultant product had 11% of the epoxy groups hydrolyzed.

Coatings were prepared from the hydrolyzed epoxy resins prepared above and compared to the unhydrolyzed epoxy resin. Also, comparisons were made with a mixture of essentially totally hydrolyzed epoxy resin

We claim:

1. A coating composition which is curable at temperatures less than about 35° C. which comprises
   (1) the product resulting from hydrolyzing at least one unhydrolyzed epoxy novolac resin having an average epoxide functionality before hydrolysis of from about 2.01 to about 10 and wherein from about 3 to about 50, percent of the epoxy groups have been hydrolyzed;
   (2) a curing amount of at least one curing agent for component (1) selected from polyamides, primary amine compounds, secondary amine compounds or mixtures thereof; and
   (3) a sufficient quantity of a suitable solvent system so as to provide the coating composition with a suitable application viscosity.

2. A coating composition of claim 1 wherein component (1) has an epoxide functionality, before hydrolysis, of from about 2.2 to about 5 and has from about 5 to about 20% of its epoxy groups hydrolyzed.

3. A coating composition of claim 2 wherein said epoxy novolac resin is a phenol-formaldehyde epoxy novolac resin.

4. A composition of claims 1, 2 or 3 wherein said curing agent is a reaction product of a polyfunctional carboxylic acid and a polyalkylenepolyamine, a polyalkylenepolyamine or a mixture thereof.

5. A composition of claim 4 wherein said solvent system comprises (a) a mixture of xylene, methyl isobutyl ketone and the methyl ether of propylene glycol or (b) methyl ethyl ketone.

* * * * *